May 26, 1953

F. SCHAFER 2,639,740

MACHINE FOR CUTTING MATCH SPLINTS

Filed May 19, 1948

Inventor
Frank Schafer
By Ira Milton Jones
Attorney

May 26, 1953   F. SCHAFER   2,639,740
MACHINE FOR CUTTING MATCH SPLINTS
Filed May 19, 1948   7 Sheets-Sheet 3

Inventor
Frank Schafer

May 26, 1953  F. SCHAFER  2,639,740
MACHINE FOR CUTTING MATCH SPLINTS
Filed May 19, 1948  7 Sheets-Sheet 5

Inventor
Frank Schafer
By Ira Milton Jones
Attorney

May 26, 1953  F. SCHAFER  2,639,740
MACHINE FOR CUTTING MATCH SPLINTS
Filed May 19, 1948  7 Sheets-Sheet 6

Inventor
Frank Schafer

Patented May 26, 1953

2,639,740

UNITED STATES PATENT OFFICE 2,639,740

MACHINE FOR CUTTING MATCH SPLINTS

Frank Schafer, Oshkosh, Wis., assignor to The Bell Machine Company, Oshkosh, Wis., a corporation of Wisconsin Application May 19, 1948, Serial No. 27,973

15 Claims. (Cl. 144—42)

This invention relates to the manufacture of wooden match sticks and has as an object to provide a machine which in an eight hour day will cut more than four million splints or match sticks from precut blocks of wood fed thereto either manually or automatically.

The machine of this invention is designed to cut splints or sticks in accordance with the method described and claimed in the copending application of Frank Schafer, Serial No. 27,972, filed May 19, 1948, now Patent No. 2,594,351. That method comprises providing a substantially oblong block of wood having a with-the-grain dimension equal to the desired length of the splints or sticks; cutting parallel slits with the grain into one face of the block to a depth slightly greater than the desired thickness of the splints or sticks, and with the slits spaced apart a distance equal to the desired width of the finished splints or sticks; and then slicing off the slitted portion of the block with a knife blade moving in a plane parallel to the slitted face and spaced back therefrom the desired thickness of the sticks.

With a view toward adapting this method to highest possible production this invention contemplates a machine in which the slits are cut into the face of the block by gangs of knives mounted on the end of an arm revolving at high speed about a fixed axis, preferably disposed vertically so that the circular orbits of the individual knives occupy horizontal planes, while the slitted portion of the block is sliced off by a guillotine blade reciprocated on a vertical plane in timed relation with the revolving knives.

One of the more specific objects of this invention is to provide means for accurately and successively presenting blocks of wood to the revolving knives and reciprocating guillotine blade.

Inasmuch as the spacing between slits defines the width of the finished splints, if all of the knives were arranged in one row or gang the necessarily close spacing between them would present serious difficulties in the mounting of the knives. In addition, the closely spaced knives would pinch the wood between them and thus increase the power required to drive the knives.

To obviate these difficulties this invention contemplates the provision of a machine in which the slits are formed by two successively acting gangs of knives arranged in staggered relation so that the spacing between adjacent knives is twice the width of a splint, the trailing gang of knives cutting slits between and equispaced from the slits cut by the leading gang of knives.

While such alternate slitting allows greater space between adjacent knives, the "lands" left between the slits cut by the leading gang of knives, if not supported against the thrust of the oncoming trailing knives, are apt to be torn off the face of the block.

To guard against this possibility this invention contemplates as another of its objects the provision of a toothed backup plate positioned to have the slitting knives pass through the space between its teeth which are so proportioned as to support the "lands" against endwise displacement by the trailing slitting knives.

As will appear more fully hereinafter, since the slitting knives pass through the spaces between the teeth of the backup plate they enter the mouth of the holder by which the blocks are presented to the knives and of which the backup plate forms one side. Thus the leading block need not project a full splint thickness from the mouth of the holder during the cutting of the slits, and this materially increases the support given the blocks by the toothed backup plate.

To utilize fully the advantage of this structural relationship, it is another object of this invention to provide power driven means coordinated with the action of the slitting knives and guillotine blade for advancing the blocks in steps each approximately half a splint thickness thus to project the leading block from the mouth of the block holder substantially half a splint thickness before the slitting knives act and then after the slits are cut and before the guillotine blade acts, to project the block the rest of the splint thickness.

Another object of this invention is to provide means for securely gripping the blocks directly adjacent to the face thereof being acted upon by the slitting knives and guillotine blade and to press the blocks yieldingly against the toothed backup plate at all times regardless of inevitable variations in the dimensions of the blocks.

Another object of this invention is to provide means for counteracting any tendency of the revolving slitting knives to follow the grain of the wood and thereby cut splints or sticks of nonuniform width.

Another object of this invention is to provide a machine of the character described wherein the slitting knives and the guillotine blade are readily removable for sharpening or replacement.

Another object of this invention is to provide positive block-feeding means by which the blocks of wood are intermittently advanced and at the same time held down on the bottom of the feed trough.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which.

Referring now particularly to the accompanying drawings in which like numerals designate like parts throughout the several views, the numeral 5 designates the base of the machine which is mounted upon legs 6. A main upright supporting wall 7 is bolted to the base 5 and is held in upright position by a bracket 8 and a rectangular frame 9.

Figure 4:
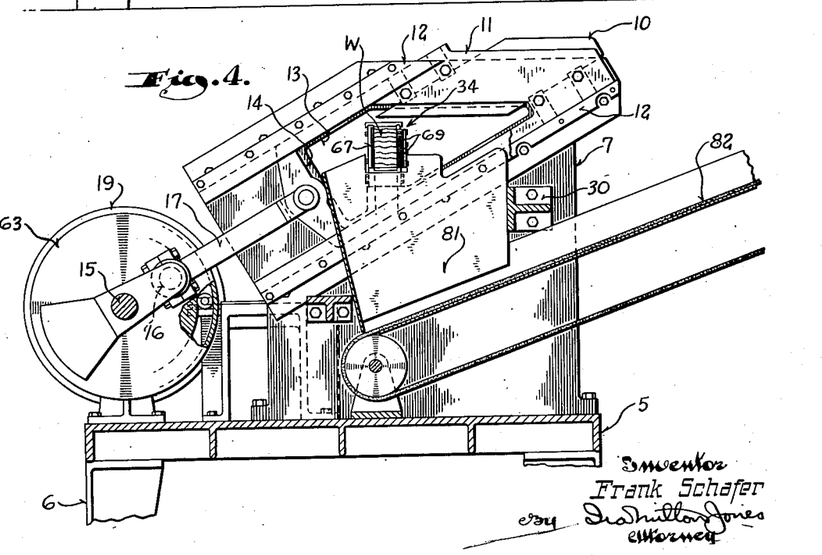
Figure 4 is a cross sectional view through Figure 2 on the plane of the line 4—4.

As best shown in Figure 4 the upright wall 7 slidably mounts a guillotine blade 10. This blade is removably attached to a carrier 11 reciprocable in parallel slideways 12 fixed to the main supporting wall 7 and disposed at an angle of approximately thirty degrees (30°) to the horizontal so that the reciprocation of the guillotine blade is in a vertical plane along a line approximately thirty degrees (30°) to the horizontal. Attention is directed to the fact that the cutting edge of the guillotine blade is horizontal.

An irregularly shaped hole 13 in the upright supporting wall 7 and an opening 14 in the blade carrier 11 provide for the projection of the work, i. e. blocks of wood W, into the path of the reciprocating guillotine blade from behind the upright supporting wall 7.

Figure 1:
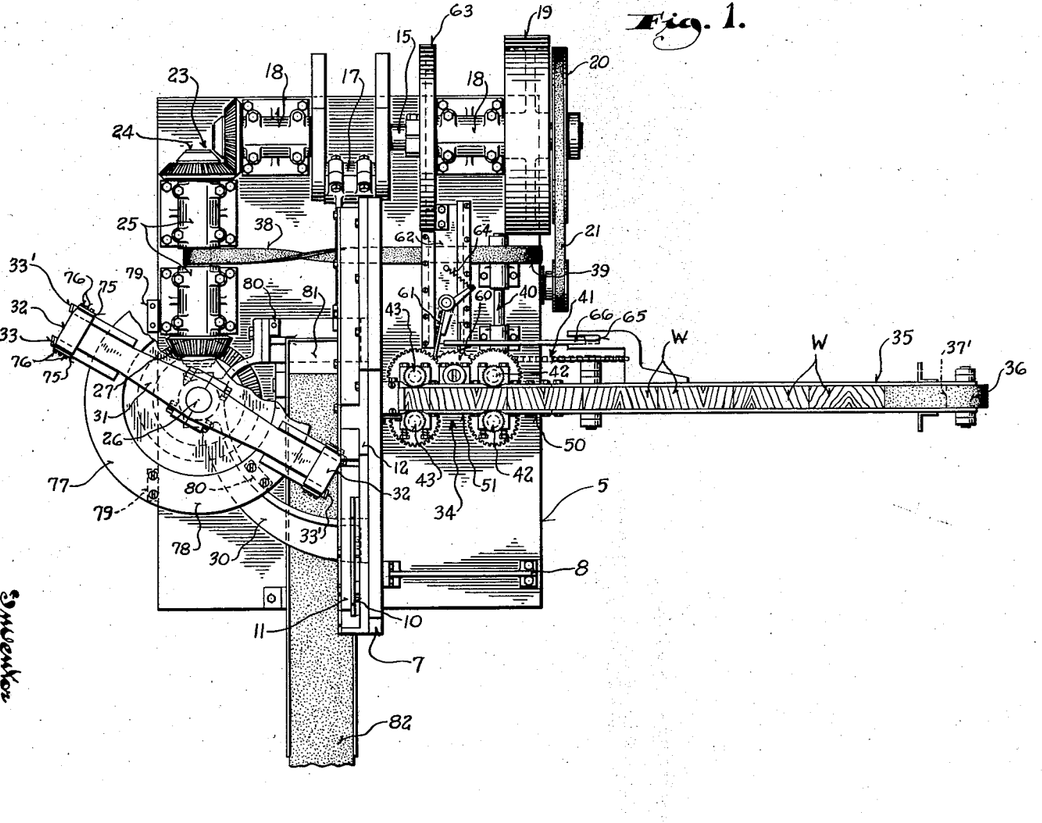
Figure 1 is a top plan view of a splint cutting machine constructed in accordance with this invention.
Figure 3:
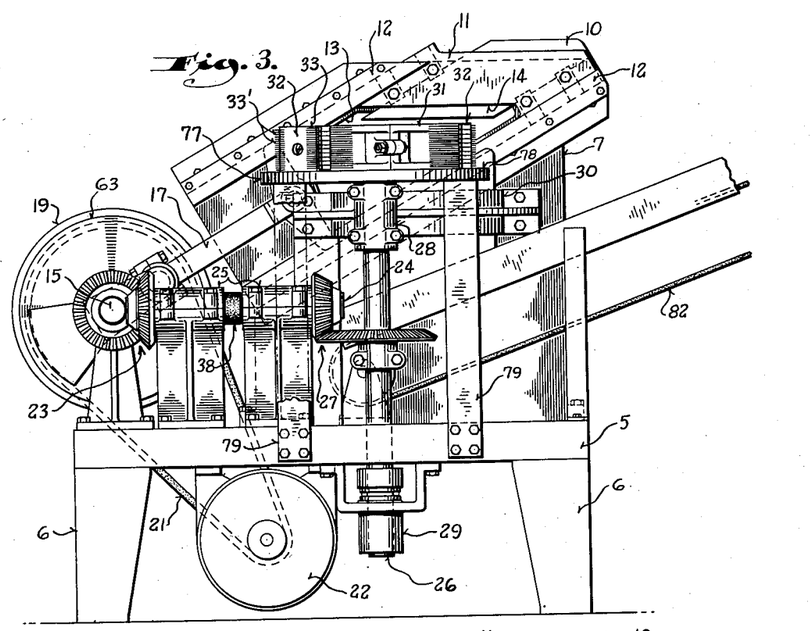
Figure 3 is a side view of the machine.

Reciprocation is imparted to the blade carrier 11 from a crank shaft 15 having its crank pin 16 connected with the carrier 11 by a pitman or connecting rod 17. The crank shaft 15 is journalled in bearings 18 mounted on the base 5 and extends across one end of the machine as shown in Figure 1. A flywheel 19 is fixed to the crank shaft adjacent to the back of the machine and a pulley 20 mounted on the crank shaft outwardly of the flywheel and a V-belt 21 provide means for driving the crank shaft from a motor 22 hung from the underside of the base as shown in Figure 3.

A set of bevel gears 23 drivingly connects the opposite or forward end of the crank shaft with a cross shaft 24 journalled in bearings 25, and this shaft drives a vertical shaft 26 through a set of bevel gears 27. The vertical shaft 26 is journalled in bearings 28 and 29, the latter being suspended from the underside of the base and the former being mounted on a yoke-like bracket 30 which is bolted to the front of the main supporting wall 7.

Figure 11:
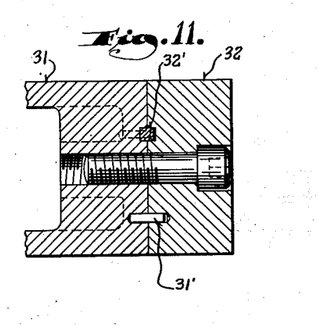
Figure 11 is a fragmentary detail sectional view through Figure 8 on the plane of the line 11—11.

The upper end of the vertical shaft 26 has an arm 31 fixed thereto to swing or revolve in a horizontal plane. Each end of this arm has a knife carrying head 32 removably bolted thereto. Preferably the securement of the heads 32 to the arm includes dowel pins 31' and keys 32' as shown in Figure 11. Each head 32 carries two sets or gangs of slitting knives 33 and 33', the latter trailing the former in their cutting action, and the spacing between adjacent knives and the positional relationship of the leading and trailing knives being such that the knives collectively cut equispaced slits.

By so dividing and arranging the knives into two sets or gangs, one leading the other, only alternate slits are cut simultaneously. If all of the knives were arranged in one row the necessarily close spacing therebetween would introduce serious difficulties in the mounting of the knives. In addition such close spacing of the knives would cause pinching of the wood between them with a consequent increase in power required to drive the knives. All of this is avoided by having the slitting knives arranged in two gangs which cut successively with the second cut slits between and equispaced from the first cut slits.

Figures 12, 13, 14, 15, 16:
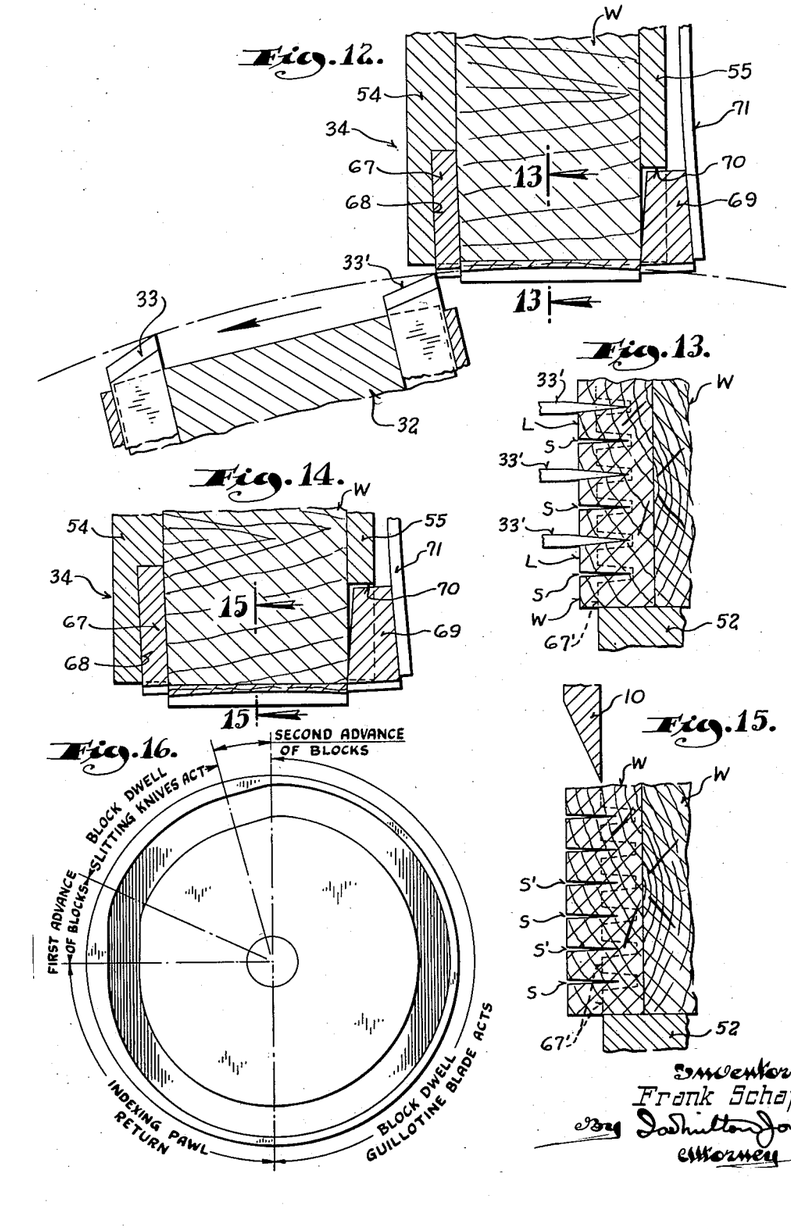
Figure 12 is a more-or-less diagrammatic horizontal sectional view through the block holder showing two successive blocks therein and illustrating the position of the projecting portion of the leading block with respect to the orbit of the slitting knives during the cutting of the slits.
Figure 13 is an enlarged vertical sectional view through Figure 12 on the plane of the line 13—13 and showing the trailing slitting knives moving through the block and the manner in which the "lands" between the first cut slits are supported against the thrust of the trailing slitting knives.
Figure 14 is a view like Figure 12 but showing the projecting part of the leading block advanced the balance of the splint thickness preparatory to being sliced off by the guillotine blade.
Figure 15 is an enlarged sectional view like Figure 13 but on the plane of the line 15—15 in Figure 14 and showing the relationship of the parts during the guillotining.
Figure 16 is a diagrammatic view of the box cam which indexes the block advancing means.

The cutting edges of the knives 33—33' are slanted to attack the work with a negative angle which angle of attack is the same for each gang as shown in Figure 12. This requires the cutting edge of the leading knives 33 to be at a lesser angle to the sides of the knives than that of the trailing knives 33'. In actual practice this angle is 69° for the leading knives 33 and 80° for the trailing knives 33'.

The knives 33—33' swing in horizontal orbits past the mouth of a block holder 34 by which the blocks of wood W are presented to the knives and the reciprocating guillotine blade. This block holder is especially designed to grip firmly and rigidly hold the blocks closely adjacent to the portions thereof being acted upon by the knives and the blade. The way in which this holder grips the blocks and secures them against displacement is largely responsible for the remarkable efficiency of the machine.

The block holder 34, as well as the adjacent end of a feed trough 35 which leads thereto, is seated upon the frame 9, and the holder 34 extends through the hole 13 in the main upright wall 7 to support the blocks at the point of knife action.

As the knives 33 and 33' sweep across the front of the holder 34 they successively cut parallel slits into the face portion of a block projecting therefrom. These slits run with the grain and are spaced apart the thickness of the finished splints or sticks. Inasmuch as the splints or sticks are preferably square, the minimum depth of the slits should be slightly greater than the space between them so that the guillotine blade can slice off the slitted face portion of the block and with one stroke cut off as many finished splints or sticks as the height of the block will produce. The length of the finished stick is, of course, determined by the with-the-grain dimension of the blocks.

Obviously the reciprocation of the guillotine blade and the revolution of the slitting knife carrying arm 31 must be coordinated and timed so that the blade acts after each end of the revolving arm 31 sweeps past the work. This relationship is established and maintained by the positive drive connection between the crank shaft 15 and the vertical shaft 26.

The blocks W to be cut into splints are fed forwardly along the feed trough 35 by an endless continuously travelling belt 36 which rides along the bottom of the trough, being trained over pulleys 37 and 37'. The pulley 37 is continuously driven from the cross shaft 24 by a belt 38 trained about the medial portion of this shaft and a pulley 39 fixed to a jack shaft 40. The jack shaft 40 is journalled in bearings mounted on the base and is drivingly connected with the shaft of the pulley 37 by a sprocket chain drive indicated generally by the numeral 41.

As the blocks leave the belt 36 they are gripped between the first pair of feed rolls 42, which together with a second pair of feed rolls 43, intermittently advance the blocks to the holder 34. The intermittent advance of the blocks by these feed rolls is timed with the action of the knives and blade and projects the leading block beyond the mouth of the block holder 34 after each retraction of the guillotine blade and before the approaching gangs of slitting knives reach cutting position, half the thickness of the splints or sticks being cut.

The feed rolls 42 and 43 are fixed to the upper ends of upright shafts 44 and 45 respectively, and each of said shafts is journalled in top and bottom bearings 46 and 47 respectively. The top bearings 46 are mounted on the opposite sides of the frame 9. Those at one side of the frame are fixed while those at the opposite side thereof are yieldingly mounted to permit spring resisted outward displacement. To this end springs 48 are interposed between these bearings and the heads of the screws 49 by which they are secured to the frame 9.

In the normal free positions of the yieldingly mounted top bearings 46 the peripheral surfaces of all of the feed rolls 42—43 project slightly into the feed trough through openings in the sides thereof, which at this point are defined by plates 50 and 51. Hence, as the blocks of wood travelling along the trough are gripped by the feed rolls, the rolls are spread apart a slight distance against the tension of the springs 48.

The bearings 47 which support the lower ends of the shafts 44—45 are directly bolted to the frame casting 9, the slight outward movement of the feed rolls against the tension of the springs 48 being accommodated by flexure of the shafts.

Figure 2:
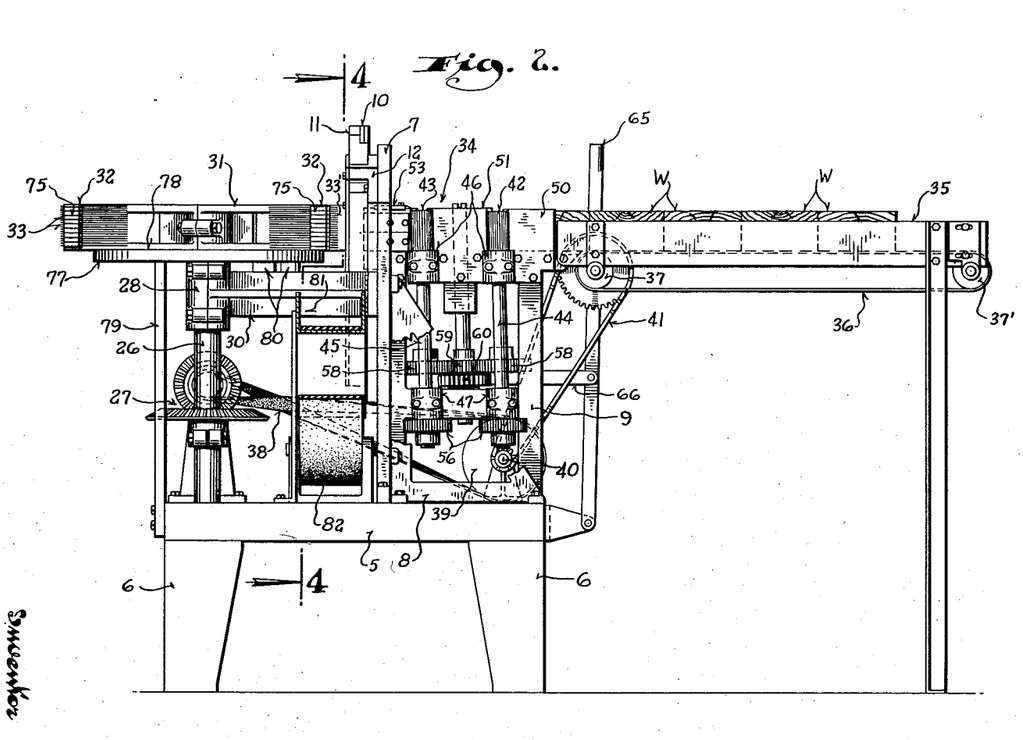
Figure 2 is an end view thereof.
Figure 5:
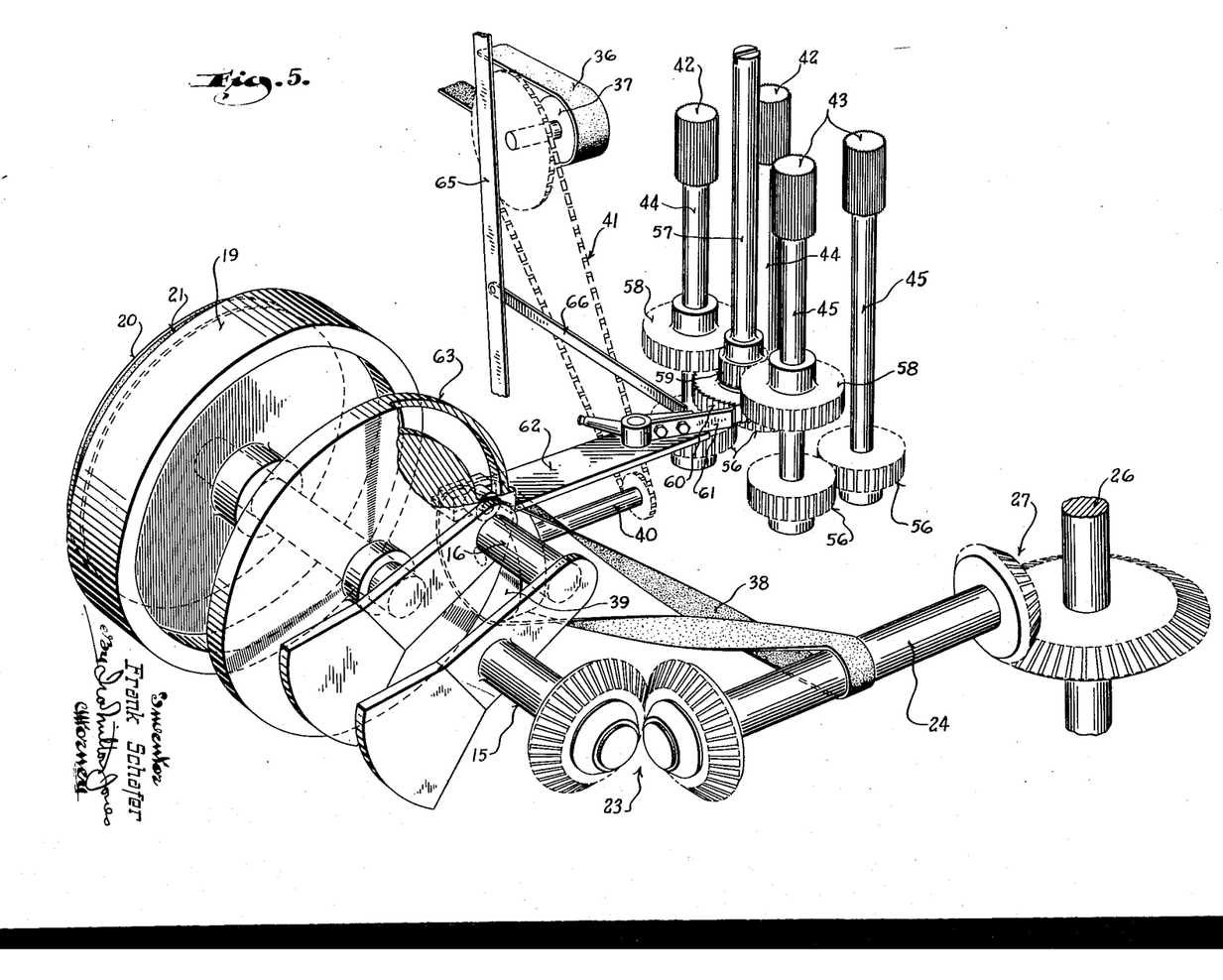
Figure 5 is a perspective view illustrating the drive mechanism of the machine and the means for feeding the blocks toward the cutting knives.
Figure 6:
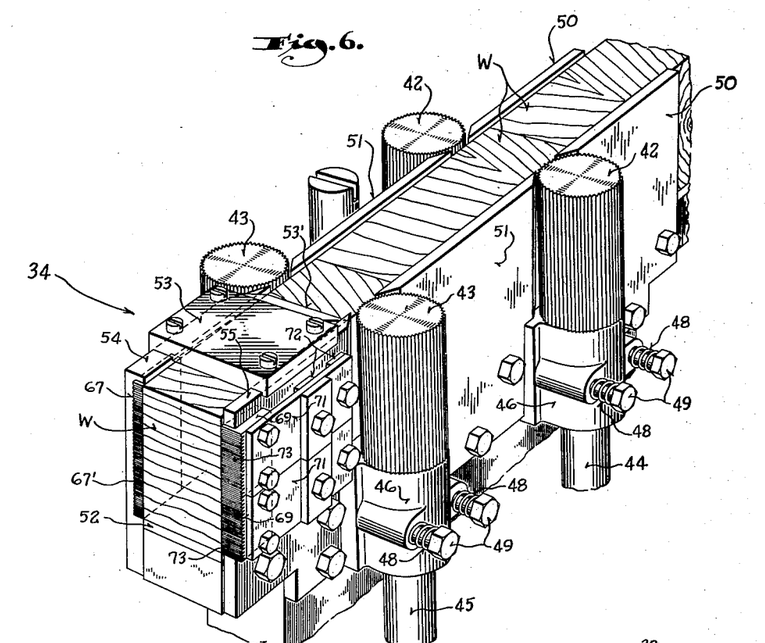
Figure 6 is a perspective view of the block feeding mechanism per se.

Attention is directed to the fact that the shafts 44—45 and consequently the feed rolls fixed thereto are set at a slight forward angle as shown in Figures 2 and 5. Thus the action of the feed rolls not only advances the blocks but imposes a downward thrust thereon to hold them down on the bottom of the feed trough as they enter the block holder 34. Unless the blocks seat firmly on the bottom of the block holder, especially at the mouth thereof, the guillotine blade cannot function properly.

In effecting its cutting action the guillotine blade coacts with a plate 52 which forms the bottom of the block holder 34 at the mouth thereof and is removable for ready replacement when worn. As noted hereinbefore the cutting edge of the guillotine blade is horizontal and thus parallel with the slits cut into the face of the block. Consequently as the guillotine blade moves across the mouth of the block holder the splints are individually and successively severed from the block without being curled or deformed as would be the case if the edge of the blade were not parallel with the slits. Also because of this horizontal disposition of its cutting edge and its oblique movement across the face of the block the guillotine blade slices rather than shears off the slitted portion.

Though the blocks are precut to size a block may be slightly higher than the total span of the slitting knives. If such a block were permitted to pass to the knives it would result in an overwidth splint or stick, i. e. overwidth to the extent said block was higher than the topmost slitting knife. To guard against this condition a knife edge 53' extends across the entry to the block holder 34 to slice off any excess height from the advancing blocks. This knife edge is formed on the top wall 53 of the block holder, which in turn is fixed to the sides 54 and 55.

All of the feed rolls 42—43 are driven. Hence, the shafts of each pair of rolls are geared together by gears 56 and one shaft from each pair is geared to a ratchet shaft 57 by means of gears 58 meshing with a pinion 59 on the ratchet shaft 57. The ratchet shaft 57 has a ratchet wheel 60 fixed to the lower end thereof with which a pawl 61 coacts and the pawl 61 is mounted on a reciprocable index slide 62 which in turn is reciprocated by a box cam 63 fixed to the crank shaft 15. A spring 64 holds the pawl in operative engagement with the ratchet wheel and the parts are so proportioned and related that with each rotation of the crank shaft 15 and each half rotation of the slitting knife shaft 26 (by virtue of the two-to-one ratio of the bevel gears 27) the ratchet wheel is indexed to advance the blocks the thickness of a splint or stick, but as shown in Figure 16 this advance of the blocks takes place in two steps, one of which occurs before and the other after the slitting knives act.

By means of a hand lever 65 and a push bar 66 the pawl may be held from engagement with the ratchet wheel so that the feeding of blocks may be stopped without shutting down the machine.

As noted hereinbefore the block holder 34 is designed to grip and support the blocks directly adjacent to the point of knife action. In a vertical direction this support is provided essentially by a removable shear plate 52 which coacts with the cutting edge of the guillotine blade to slice or shear off the slitted face portion of the block protruding beyond the edge of the plate 52.

Figure 7:
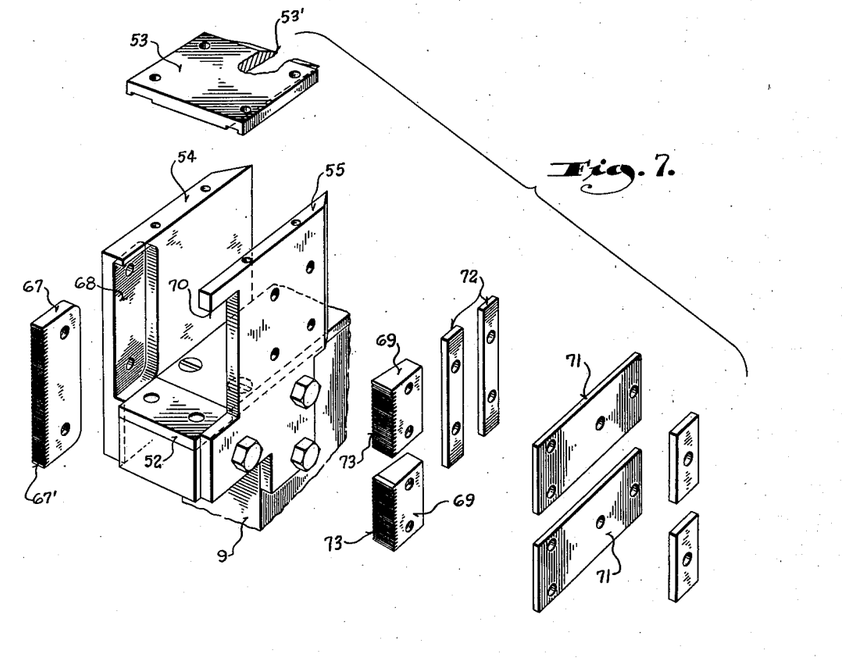
Figure 7 is a detail perspective view of the elements comprising the terminus of the block guideway or trough by which the blocks are firmly held directly adjacent to the exposed end thereof being acted upon by the knives and blade, said elements being shown disassembled and substantially in their proper order of assembly.

In the horizontal direction the face portion of the block being acted upon by the slitting knives is supported by a backup plate 67 removably mounted in a pocket 68 formed in the side wall 54 of the block holder. As clearly shown in Figure 7 both side walls 54 and 55 are spaced back from the shearing edge of the plate 52 a distance sufficient to accommodate the maximum depth cut by the slitting knives 33—33'.

To provide support for the block as closely as possible to the edge thereof being acted upon by the slitting knives the backup plate 67 has teeth 67' on its front edge. These teeth are so proportioned and spaced that the slitting knives pass between the teeth while the teeth support the "lands" left between the first cut slits against the thrust of the oncoming trailing knives. The blocks are firmly held against the backup plate 67 by clamping shoes 69 occupying an opening 70 in the front edge of the side plate 55. These clamping shoes are carried by stiff leaf springs 71 anchored to the outer face of the plate 55 with spacers 72 interposed therebetween, and their inner faces are slanted to constrict the width of block holder towards the mouth thereof and thereby evoke the pressure of the springs 71 upon the blocks as they are fed through the holder. For the same purpose the bottom of the pocket 68 is also slightly slanted as shown in Figures 12 and 14.

Two clamping shoes are provided rather than one of a size to encompass the full height of the blocks, so as to assure positive clamping pressure over substantially the entire side of the block regardless of possible variations in the with-the-grain thickness thereof. Also, as will be readily apparent, through the use of plural clamping shoes substantially uniform pressure will be maintained upon the blocks even though they may be of less than full height.

The front edges 73 of the clamping shoes like the front edge 67' of the backup plate 67 have comb teeth to allow for the passage of the slitting knives while exerting pressure on the blocks as far forward as possible.

Figures 8, 9:
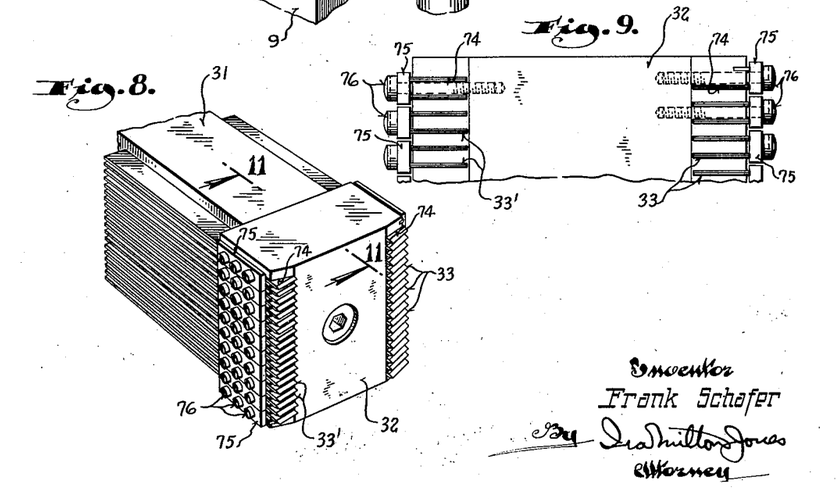
Figure 8 is a perspective view of one end of the revolving knife carrier arm showing the horizontal slitting knives in position thereon.
Figure 9 is an enlarged detail view of a portion of the arm shown in Figure 8 to illustrate particularly the way in which the individual knives are mounted.
Figure 10:
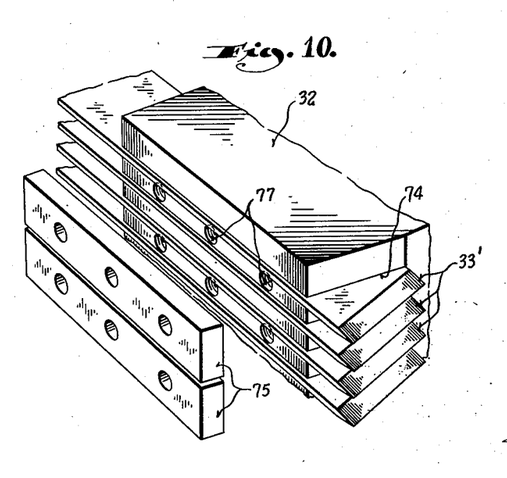
Figure 10 is an enlarged detail perspective view to illustrate more clearly the way in which individual slitting knives are removably secured in position.

The clamping plates are secured in place by screws 76 threaded into holes 77 tapped into the lands between the slots 74, and each clamping plate engages the two adjacent knives and as shown in Figures 8 and 9 the slots 74 at one side of the head 32 lie in planes bisecting the space between the slots at the other side of the head to bring about the aforementioned staggered relationship of the knives 33 with respect to the knives 33'. As hereinbefore mentioned this arrangement simplifies the mounting of the knives and by precluding the pinching of the wood which would occur if all of the knives acted simultaneously it lightens the load of the cutting action and insures a smoother machine operation and a better match splint or stick.

Inasmuch as the knives 33—33' cut along the grain of the blocks there is a tendency for the knives to be deflected up or down, and to guard against any such upward or downward deflection of the knife carrying arm a rigid supporting table 77 is provided. The top face of this table provides a finished circular track surface 78 upon which the outer ends of the arm 31 ride as clearly shown in Figure 2. Hence, the outer ends of the arm 31 are firmly supported against vertical deflection. The table 77 is supported by a pair of legs 79 which extend up from the base 5 and by shorter legs 80 formed as pads on the bracket 30.

The finished splints sliced off the block fall into a hopper 81 which discharges onto a conveyor belt 82, and this belt carries the splints into a solution tank (not shown) where they are impregnated with a non-glowing solution in accordance with the prevailing practice of match making.

*Operation*

With the machine in operation so that the guillotine blade 10 is being reciprocated in timed relation with the revolution of the slitting knife carrying arm 31, blocks of wood are either manually or automatically positioned upon the feed trough 35. These blocks are, of course, precut to size to pass snugly through the block holder 34 by which they are presented to the revolving slitting knives and reciprocating guillotine blade. Thus, the with-the-grain dimension of the blocks determines the length of the splits or sticks and the height of the blocks determines the number of splints or sticks produced with each stroke of the guillotine blade.

The blocks positioned upon the travelling conveyor belt 36 of the feed trough are carried forwardly into the bite of the feed rolls 42 and 43. These rolls are intermittently driven by the pawl and ratchet mechanism which is actuated by the box cam 63, and inasmuch as the box cam is fixed to the cam shaft it is, of course, apparent that the intermittent advance of the blocks is timed with relation to the reciprocation of the guillotine blade and the revolution of the slitting knives, the timing being such that directly after each retraction of the guillotine blade the leading block is projected beyond the mouth of the block holder 34 substantially one half the thickness of the splints or sticks being cut. This condition is illustrated in Figures 12 and 13. Note that at this time the "lands" L left between the first cut slits S are supported against the endwise thrust of the trailing slitting knives 33' (indicated in Figure 13). Note also that by having alternate slits cut by separate gangs of knives the pinching of the wood between knives is reduced to a minimum.

The slitting is completed during the period of dwell between the first block advance of about one half splint thickness and the second block advance for the balance of the splint thickness. At the completion of the second step of the block advance, the leading block protrudes from the mouth of the holder 34 a distance equal to the full splint thickness. This entire protruding portion is slitted with the second cut slits S' equispaced from the first cut slits S and with all of the slits cut to a minimum depth of a full splint thickness, the depth of the slits being established by the fixed relationship between the block holder 34 and the shaft 26, the projection of knives 33—33' from the heads 32, and the extent the leading block is protruded from the mouth of the holder 34 by the first step of the block advance.

As the guillotine blade acts it slices off the slitted portion of the block, and with one stroke delivers as many splints or sticks as can be produced within the height of the block; and these finished splints or sticks drop onto the conveyor belt 82 to be carried from the machine.

From Figures 12 to 15 inclusive, especially Figure 15, it will be clear that if the leading block is held by as much as one and one-quarter (1¼) times splint thickness, its protruding slitted portion will be sliced off by the guillotine blade; and that the remaining portion (one and one-quarter (1¼) splint thickness) will be substantially completely slitted during the next slitting action inasmuch as the block is protruded only a half splint thickness before that slitting action occurs, thus leaving a three-quarter (¾) splint thickness to be held by the pressure shoes and backup plate which is sufficient for the slitting action. As a result the transition from one block to another takes place without interruption and without producing splints more than one-quarter too thick or less than three-quarters of proper thickness.

From the foregoing description taken in connection with the accompanying drawings it will be readily apparent to those skilled in the art that this invention provides a machine especially well adapted for low cost production of match splints or sticks, not only because of its tremendous capacity which is well in excess of four million splints per eight hour day, but also because it utilizes blocks cut to size from pieces ordinarily small enough to be considered scrap.

Moreover, those skilled in the art will recognize that the principles embodied in the machine of this invention can be adopted in other kindred machines not necessarily intended to cut match splints. For instance the revolving knife unit might be arranged to cut grooves across the face of the work to a depth less than each increment in the stepwise advance of the work. In this case the machine would produce grooved slabs through the sequence of operations of the machine and its general design would be the same as herein specifically described.

What I claim as my invention is:

1. In a machine of the character described: block holding means adapted to hold a block of wood with a portion thereof exposed; a rotatable shaft mounted in front of said block holding means; an arm on said shaft; a knife carrier on the outer end of the arm; a gang of spaced slitting knives on the carrier positioned to swing in circular orbits which sweep across the front of said block holder to cut parallel slits in the exposed portion of a block held thereby; and a rigid circular track upon which the outer ends of the arm ride so as to be supported thereby against deflection caused by a tendency of the slitting knives to follow the grain of the block being acted upon.

2. In a machine of the character described: a block holder adapted to hold a block of wood with a portion thereof exposed at the mouth of the holder; a rotatable shaft mounted in front of the mouth of said block holder; an arm medially mounted on said shaft; knife heads on the ends of the arm positioned to travel in a circular path past the mouth of the block holder; gangs of spaced slitting knives on the knife heads projecting radially therebeyond to form parallel slits in the exposed portion of a block held in said holder; and a rigid circular track upon which the outer end portions of said arm ride to be supported thereby against deflection which might be caused by a tendency of the slitting knives to follow the grain of the block being acted upon.

3. In a machine of the character described: a block holder adapted to grip firmly and hold a block of wood while machine driven knives act thereon; means for intermittently advancing blocks of wood to and through said holder, including a feed trough having a flat bottom support across which the blocks are fed; and a pair of feed rolls spring urged toward each other and between which the blocks move, said feed rolls having their axes transverse to said bottom support and inclined in the direction of feed so that said feed rolls impart a downward thrust upon the blocks as they act thereon to feed them forwardly.

4. In a machine for cutting match splints from blocks of wood, the combination of: a slitting knife unit mounted for rotation about a fixed axis and comprising a leading and a trailing gang of axially spaced knives, the knives of one gang being axially spaced intermediate the knives of the other gang so that each gang is adapted to cut parallel slits spaced apart twice the width of the match splints being cut, the slits cut by the trailing gangs bisecting the lands between the slits cut by the leading gang, all of the knives having their cutting edges equidistant from the axis of rotation; means for holding blocks of wood with a part thereof protruding into the path of the slitting knives, including a wall positioned to support the block against the thrust of the slitting knives; teeth on the outer edge of said wall spaced to permit the passage of the slitting knives therebetween; means mounting said block holding means in fixed relation to the axis of rotation of the slitting knives such that the knives pass between the teeth and extend into the spaces therebetween a distance at least half the thickness of the match splints to be cut, so that the protrusion of the block half a match splint thickness beyond the extremities of the teeth enables the cutting of slits to a depth at least equal to a full match splint thickness and whereby the teeth provide direct support for the block against the thrust of the slitting knives; means for effecting intermittent stepwise advance of the block, with each step substantially half the full thickness of the match splints to be cut; a positive drive connection between said block advancing means and the slitting knife unit whereby the slitting knives act upon the block between two steps in the advance thereof; and slicing means timed with the block advancing means and the slitting knife unit to act between the next two steps in the advance of the block and slice off the slitted portion of the block protruding beyond the extremities of the teeth.

5. In a machine for cutting match splints from blocks of wood, the combination of: a block holder adapted to grip and hold a block of wood with a portion thereof protruding from the mouth of the holder to be acted upon by slitting knives and a slicing blade; spaced teeth on the outer edge of one of the walls of the block holder, said teeth being spaced apart the desired width of the match splints to be cut and the spaces between them accommodating the passage of slitting knives; a gang of spaced slitting knives having their cutting edges aligned; means movably mounting said slitting knives for passage across the mouth of said block holder with the knives moving toward the toothed wall to cut slits into the face of a block protruding from the mouth of the holder and then pass through the spaces between the teeth, whereby the teeth directly support the block against the thrust of slitting knives; a guillotine blade mounted for movement across the block holder to slice off a portion of the block protruding therefrom; means for effecting intermittent stepwise advance of the block through the block holder with each step substantially half the full thickness of the match splints to be cut; means for driving said slitting knives, guillotine blade and block advancing means including positive drive transmission means between said slitting knives, guillotine blade and block advancing means by which the functioning of said elements is so coordinated that one step in the block advance occurs before the slitting knives act while the next step takes place after the slitting knives act and before the guillotine blade acts.

6. In a machine for cutting match sticks from a block of wood, the combination of: a movable slitting knife unit comprising a leading gang of knives and a trailing gang of knives, the knives of each gang being spaced apart and the knives of one gang lying in planes bisecting the spaces between the knives of the other gang with the cutting edges of all of the knives arranged to cut to the same depth; means constraining the knife unit to movement along a defined path; a block holder adapted to grip a block and hold the same with a portion thereof protruding from its mouth and into the path of the slitting knives, said block holder having a backup plate to support the block against the thrust of the slitting knives; spaced teeth on the outer edge of said backup plate spaced apart a distance to permit the passage of the slitting knives therebetween and to support the block between slits; means for moving the slitting knife unit along its path and across the mouth of the block holder; means for driving the block advancing means in intermittent steps each adapted to project the block from the mouth of the block holder a distance substantially half the thickness of a match stick; and a positive drive transmission between said slitting knives and block advancing means coordinating the functioning of the same so that one step in the block advance occurs before the slitting knives act upon the block while the next step occurs after the slitting knives act.

7. The combination set forth in claim 6 further characterized by the provision of a guillotine blade reciprocable across the mouth of the block holder to slice off the protruding portion of a block; and means timed with the functioning of the block advancing means for reciprocating the guillotine blade forward and backward during the time interval between said second designated step and the succeeding step of the block advance.

8. In a machine of the character described: a movable knife unit having spaced knives adapted to cut parallel slits across the face of a piece of work projected into the path of the knives; means constraining the knife unit to movement along a defined path; means for holding work to be cut by said knives including opposed walls transverse to the direction of travel of the knife unit and between which the work is clamped; and teeth on the outer edges of said walls, said teeth being spaced distances corresponding to the spacing of the knives and extending beyond the path of said knives so as to grip the foremost portion of the work at areas lying between the slits as they are cut by the knives, the knives passing through the spaces between the teeth.

9. In a machine for cutting match splints from blocks of wood: a movable slitting knife unit comprising spaced knives adapted to cut parallel slits across the face of a block of wood projected into the path of the knives; means constraining the slitting knife unit to movement along a defined path; a block holder for holding blocks of wood in position to be acted upon by the slitting knives, including a backup plate transverse to the direction of the knife travel and positioned to support the blocks against the thrust of the knives; a pressure shoe opposite said backup plate; means yieldingly urging the pressure shoe towards the backup plate to clamp a block of wood therebetween; and teeth on the outer edges of the backup plate and pressure shoe spaced to permit the passage of the slitting knives therebetween, said teeth extending beyond the path of the knives so as to grip the foremost portion of the block at areas lying directly adjacent to and at opposite sides of the slits as they are cut by the slitting knives.

10. A machine for cutting splints or small sticks from blocks of wood, comprising: a block holder having side walls and a flat bottom to receive and firmly hold a block of wood with the portion of the block to be acted upon exposed at the mouth of the holder; a rotatable cutter head shaft in front of the mouth of said holder and perpendicular to the plane of its bottom; a cutter head on said shaft having a gang of axially spaced slitting knives on the outer periphery thereof to be swung by rotation of the shaft in circular orbits which cross the mouth of the block holder in close juxtaposition thereto from side wall to side wall and parallel to the plane of the bottom thereof so that said slitting knives cut parallel slits in the exposed portion of the block as they are swept across the mouth of the block holder by rotation of the cutter head shaft; a guillotine blade; means slidably mounting the guillotine blade between the mouth of the block holder and the rotatable cutter head shaft, said means constraining the guillotine blade to reciprocation in a fixed plane which is parallel to the axis of the cutter head shaft, transverse to the block holder and closely adjacent to the mouth thereof and nearer the axis of the shaft than the radial distance between the knife edges and the shaft axis so that the plane of reciprocation of the guillotine blade chordwise intersects the circular orbits of the knife edges whereby the guillotine blade may slice off a slitted portion of a block protruding from the mouth of the holder; and driving means for rotating said cutter head shaft and reciprocating the guillotine blade in sequential timed relation so that the slitting knives and guillotine blade act sequentially upon the block.

11. The machine for cutting splints or small sticks from blocks of wood set forth in claim 10 further characterized by the fact that the mounting means for the guillotine blade constrains the blade to reciprocation along a path which extends obliquely across the mouth of the block holder; and further by the fact that the cutting edge of the guillotine blade is at all times parallel to the flat bottom of the block holder.

12. In a machine of the character described: an elongated horizontal block holder having a bottom and sides and having a discharge mouth at one end thereof, and along which blocks may be fed toward said mouth; a revolvable cutter head having a gang of slitting knives on the periphery thereof with their cutting edges parallel to one another and in superimposed relation; means mounting the cutter head for rotation about an axis perpendicular to the bottom of the block holder and spaced in front of the mouth of the block holder a distance such that the cutting edges of the knives travel in circular orbits across the mouth of the block holder in close juxtaposition thereto from one side to the other of the block holder to cut parallel slits in the end of a block held in the mouth of the block holder; a guillotine blade; and means mounting and constraining said guillotine blade to reciprocation in a fixed plane parallel to the axis of the revolvable cutter head, between said axis and the mouth of the block holder and chordwise intersecting the circular orbits of the slitting knives, so that the guillotine blade may slice off a slitted portion of a block protruding from the mouth of the block holder.

13. In a machine of the character described, the structure set forth in claim 12 further characterized by the provision of teeth on the outer edges of the side walls of the block holder at the mouth thereof, said teeth being spaced apart a distance corresponding to the space between the slitting knives and extending across the circular orbits of the slitting knives to grip the portion of the block acted upon by the slitting knives at areas between the slits cut by the knives, the knives passing through the spaces between the teeth.

14. In a machine of the character described, the combination of: an upright supporting wall having a hole therethrough; a block holder at one side of the supporting wall fixed with respect thereto with the mouth of the holder in line with the hole in the supporting wall to hold a block of wood with a portion thereof exposed at the opposite side of the wall; a revolvable slitting knife unit at said opposite side of the wall; means mounting the slitting knife unit for revolution about an axis parallel to the wall and in front of the mouth of the block holder but spaced therefrom, said revolvable slitting knife unit having a gang of axially spaced slitting knives which travel in circular orbits which cross the mouth of the block holder in close juxtaposition thereto to cut parallel slits in the end of a block held in the mouth of the block holder; a guillotine blade; a slideway on said upright supporting wall at the same side thereof at which the revolvable slitting knife unit is mounted, slidably mounting the guillotine blade for reciprocation across the hole in the supporting wall and hence across the mouth of the block holder whereby the guillotine blade may slice off a portion of a block protruding from the mouth of the block holder; and means for revolving the slitting knife unit and reciprocating the guillotine blade in sequential timed relation.

15. In a machine of the character described, the combination set forth in claim 14 further characterized by the fact that the slideway in which the guillotine blade is mounted extends obliquely across the mouth of the block holder; and further by the fact that the cutting edge of the guillotine blade is at all times parallel to the planes of the circular orbits of the slitting knives so that the cutting edge of the guillotine blade though progressing obliquely across the protruding portion of a block held in the block holder is at all times parallel to the slits cut therein by the slitting knives.

FRANK SCHAFER.

References Cited in the file of this patent

UNITED STATES PATENTS

| Number | Name | Date |
|---|---|---|
| 273,908 | Steber | Mar. 13, 1883 |
| 315,509 | Johnson | Apr. 14, 1885 |
| 410,299 | Spofford | Sept. 3, 1889 |
| 497,932 | Tinkham | May 23, 1893 |
| 508,515 | Graham et al. | Nov. 14, 1893 |
| 517,625 | Powers | Apr. 3, 1894 |
| 525,835 | Bennett | Sept. 11, 1894 |
| 615,693 | Fox | Dec. 13, 1898 |
| 643,546 | Sisum | Feb. 13, 1900 |
| 657,666 | Melby | Sept. 11, 1900 |
| 657,817 | Ensign | Sept. 11, 1900 |
| 666,631 | Walters | Jan. 22, 1901 |
| 716,811 | Criswell | Dec. 23, 1902 |
| 754,055 | Dietmann | Mar. 8, 1904 |
| 773,570 | Hutchinson | Nov. 1, 1904 |
| 1,052,510 | Parker | Feb. 13, 1913 |
| 1,101,285 | Hutchinson | June 23, 1914 |
| 1,104,858 | Wolvin | July 28, 1914 |
| 1,138,777 | Oakley | May 11, 1915 |
| 1,629,742 | Scott | May 24, 1927 |
| 1,663,978 | Friede et al. | Mar. 27, 1928 |
| 1,763,463 | Garthe | June 10, 1930 |
| 1,963,225 | Brugger | June 19, 1934 |
| 1,963,865 | Palmer et al. | June 19, 1934 |
| 2,008,317 | Voigt | July 16, 1935 |
| 2,278,032 | Youngman | Mar. 31, 1942 |